Sept. 5, 1967  L. T. FIKE  3,339,241
TIRE RETREADING MATRIX WITH ANNULAR STEAM CHAMBER
Filed March 22, 1965  2 Sheets-Sheet 1
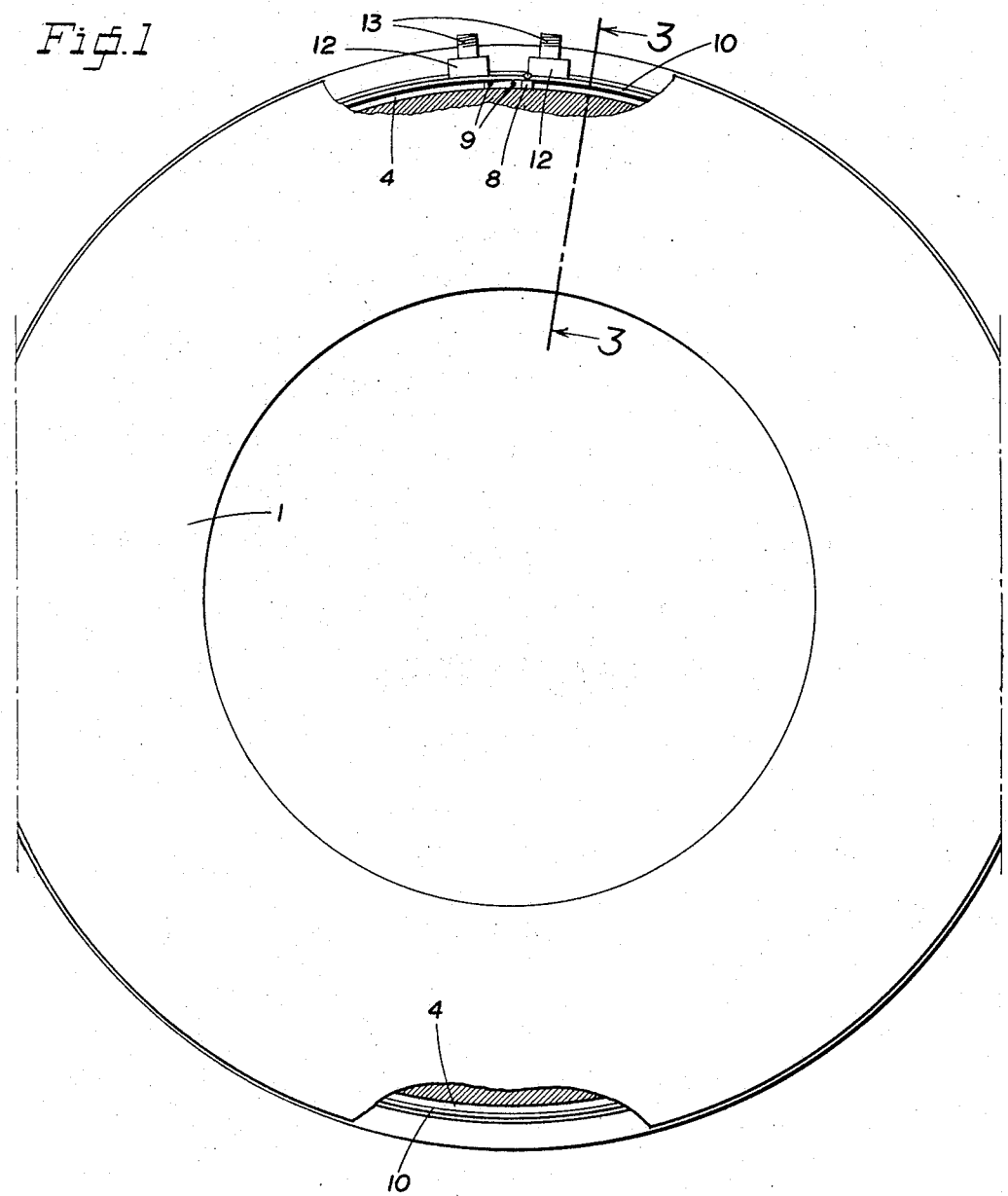
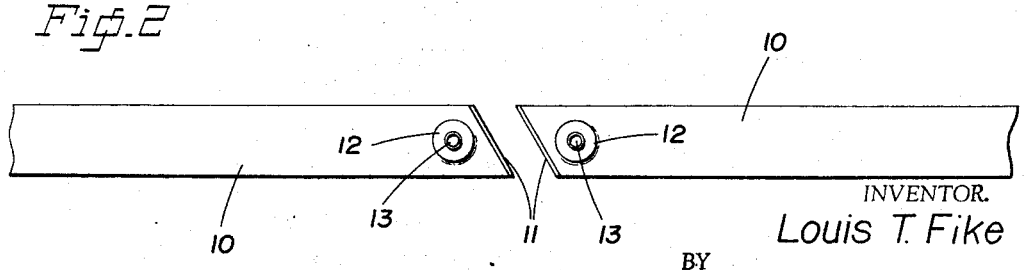
INVENTOR.
Louis T. Fike
BY
Webster & Webster
ATTORNEYS Sept. 5, 1967    L. T. FIKE    3,339,241
TIRE RETREADING MATRIX WITH ANNULAR STEAM CHAMBER
Filed March 22, 1965    2 Sheets-Sheet 2
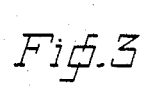
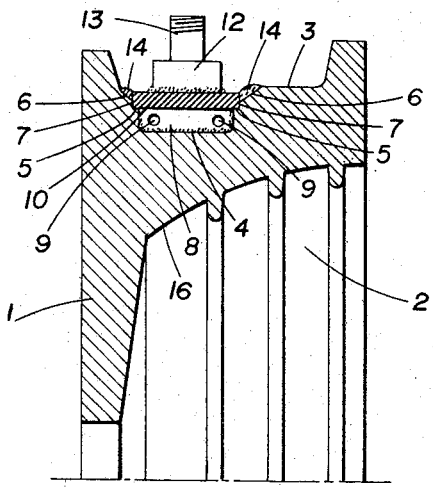
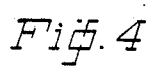
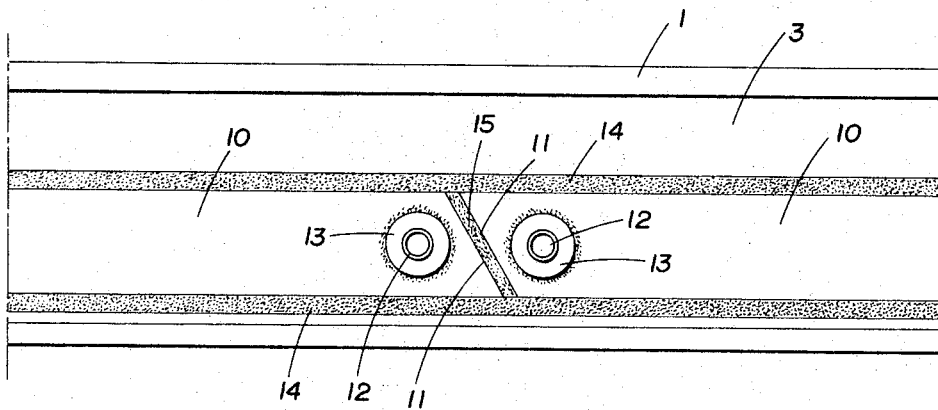
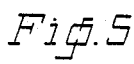
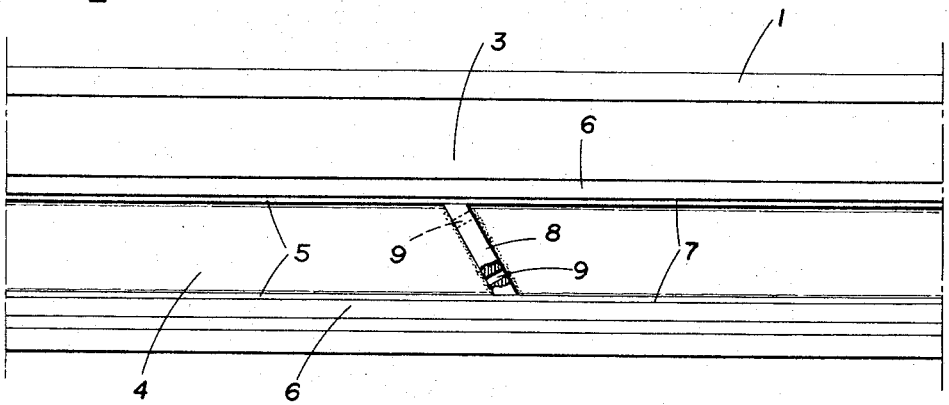

_United States Patent Office_

3,339,241
Patented Sept. 5, 1967

3,339,241
TIRE RETREADING MATRIX WITH ANNULAR STEAM CHAMBER
Louis T. Fike, Lodi, Calif., assignor to Super Mold Corporation of California, Lodi, Calif., a corporation of California
Filed Mar. 22, 1965, Ser. No. 441,652
2 Claims. (Cl. 18—38)

ABSTRACT OF THE DISCLOSURE

A steam heated matrix, for the reception of a tire for retread vulcanization, wherein an included circumferential steam chamber is constructed in a simple manner, yet provides for continuous and effective circulation of steam about the matrix.

---

Heretofore it has been a common practice to heat such matrices by means of steam pipes or tubes cast in or fastened thereto; these expedients, however, presented the problem of attaining complete and continuous metal-to-metal contact between the matrices and the pipes or tubes. As a consequence there frequently occurred an uneven heating of a matrix with a resultant adverse effect on the cure of the new tread rubber or "camelback" on the tire.

It is the major object of the present invention to provide a matrix, for the purpose describel, which avoids the above objection by the inclusion of an annular, pressure tight steam chamber formed in the main by the metal of the matrix and thus effective to produce and maintain a uniform heating of the matrix throughout its entire extent and to the end that a proper cure of the new tread rubber or camelback on the tire is accomplished.

Another important object of this invention is to provide a matrix, as in the preceding paragraph, wherein the direct-contact of the steam with the metal of the matrix assures of a more rapid initial heating thereof.

A further object of the invention is to provide a tire retreading matrix with an annular steam chamber which is designed for ease and economy of manufacture.

A still further object of the invention is to provide a practical, reliable, and durable tire retreading matrix with an annular steam chamber, and one which is exceedingly effective for the purpose for which it is designed.

These objects are accomplished by means of such structure and relative arrangement of parts as will fully appear by a perusal of the following specification and claims.

In the drawings:

FIG. 1 is an outside elevation of a matrix half in which the improved steam heating means is incorporated; the view being partly broken away and in section.

FIG. 2 is a fragmentary view of the steam channel cover band, detached.

FIG. 3 is an enlarged radial section of the matrix half, taken on line 3—3 of FIG. 1.

FIG. 4 is a fragmentary peripheral view of the matrix half, showing the steam heating means incorporated therein.

FIG. 5 is a similar view, but showing the steam channel before the cover band is mounted thereover.

Referring now more particularly to the drawings and to the characters of reference marked thereon, a tire-receiving matrix of the type for which the improved steam heating means is particularly designed (but not limited), comprises a pair of substantially identical full-circle matching halves, one of which is shown at 1. These two matrix halves are, of course, arranged to be detachably connected together as a unit and so as to enclose the tread portion of a tire within the matching matrix cavities; one of said cavities being shown at 2.

The peripheral face 3 of each matrix half 1, and which face is as a whole substantially parallel to the axis of the matrix, is formed—by machining or otherwise—with a continuous circumferentially extending channel 4, of relatively wide rectangular form in section, as clearly shown in FIG. 3; such channel being initially open to the face 3 but disposed some distance radially inward thereof.

The metal of the matrix half 1, radially and axially out from the outer ends of the sides of the channel 4, is cut to provide flat shoulders 5 which extend about said channel for the full extent thereof. Radially out from the shoulders a short distance, the metal of the matrix is cut on a bevel to the face 3 as shown at 6, thus leaving radially short parallel locating faces 7 at the sides of the shoulders.

A diagonally extending baffle or partition 8 is welded in the channel 4 at a certain point in the extent thereof; said baffle extending for the full width and depth of the channel so that its radially outer edge is on a level with the shoulders 5. The baffle 8, near its ends, is provided with small bleed holes 9 extending therethrough.

The channel 4 is closed by a metal cover band 10 having initially separated ends 11 which are bevel-cut on a diagonal the same as that of the baffle 8. This band 10 is the same width as the distance between the locating faces 7, and is somewhat thicker than the radial extent of said faces, as shown in FIG. 3.

Adjacent its ends the band is provided on the outside with bosses 12 which open through said band; outwardly projecting pipe nipples 13 being secured in said bosses and adapted for connection to steam intake and discharge pipes or hoses.

When the band 10 is mounted in position on the matrix half 1, said band rests on the shoulders 5; the band ends 11 engaging each other and being disposed directly over and in contact with the diagonal baffle 8. The circumferential troughs formed between the side edges of the band 10 and bevel surfaces 6 are filled with welding metal 14, while the bevel-formed groove between the contacting ends 11 of the band is filled with welding metal 15. The channel 4 and the cover band 10 thus form a pressure tight steam chamber.

It should be noted that the channel 4 is located—laterally of the matrix half 1—so that it is substantially midway of the mass of metal of the matrix half, which mass is greater toward one side than the other because of the angularity between the matrix face 3 and relatively sloping tire-tread engaging face 16 of the matrix cavity 2.

With relation to each matrix half 1 (when the matrix is in use), steam enters the completely enclosed channel 4 through one of the nipples 13, circulates completely about said matrix half, and then discharges from the other nipple 13. As the so circulating steam is in constant and direct contact with the metal of the matrix half, initially rapid and thereafter even heating is accomplished.

Placing the necessary baffle 8 on a diagonal instead of straight across the channel, insures an even distribution of the heat on the opposite sides of such baffle and avoids the formation of any cold spot in the matrix half at this point.

In order to prevent the triangular corners formed in the channel 4 by the diagonal baffle 8 from trapping or collecting condensate, small bleed holes 9 extend through the end portions of said baffle and allow the high pressure steam to blow out any condensates from such corners. The holes 9 are of such small size that they do not materially affect the desired flow of the steam about the channel 4.

From the foregoing description, it will be readily seen that there has been produced such a tire retreading matrix with annular steam chamber as substantially fulfills the objects of the invention, as set forth herein.

While this specification sets forth in detail the present and preferred construction of the tire retreading matrix with annular steam chamber, still in practice such deviations from such detail may be resorted to as do not form a departure from the spirit of the invention, as defined by the appended claims.

Having thus described the invention, the following is claimed as new and useful and upon which Letters Patent is desired:

1. A tire recapping matrix comprising:
  a pair of mating, substantially identical, full circle metallic halves, detachably connected together as a unit to enclose the tread of a tire;
  the halves each including an outer, peripheral face;
  each of said halves having a continuous, circumferentially extending channel formed therein, the channels being of substantially rectangular sectional configuration and being located intermediate the sides of each of said halves;
  opposing, flat shoulders outwardly of each of the channels, and bevel wall means outwardly of each shoulder;
  locating faces at each shoulder on either side of each channel providing locating means;
  a diagonal partition fixed in upstanding position in each channel at a selected location and extending fully across the channel and being of a depth equal to the full depth of the channel;
  a metal cover band having side edges and ends, extended about each channel;
  the locating faces providing the locating means for each of the bands;
  the side edges of the cover bands being seated on said shoulders to enclose said channels;
  metallic filler material extending from the side edges of the bands and covering said bevel wall means;
  the ends of the bands engaging one another in a position directly over and in contact with said diagonal partitions, respectively, of the channels, the bands completely enclosing the respective channels;
  nipple means adjacent each end of each of the bands, providing steam intake and discharge elements in closely spaced relation on opposite sides of each of the diagonal partitions; and
  each of said partitions having a bleed hole formed therein adjacent each of its ends, and the diagonal arrangement of the partitions providing an even heat distribution throughout the full peripheral extent of each matrix half, with trapped condensate being dispersed through said bleed holes.

2. The invention of claim 1, wherein:
  the nipple means each comprises a fitting; and
  a boss element adjacent each end of the bands for connection of the fittings.

References Cited

UNITED STATES PATENTS

| | | | |
|---|---|---|---|
| 1,396,217 | 11/1921 | Jones. | |
| 1,544,002 | 6/1925 | Grove. | |
| 1,786,291 | 12/1930 | Denmire. | |
| 2,004,800 | 6/1635 | Rogers | 18—18 |
| 2,110,293 | 3/1938 | Fisher | 18—18 X |
| 2,232,760 | 2/1941 | Atkins | 18—18 |
| 2,599,433 | 6/1952 | Cohen | 18—18 |
| 2,602,210 | 7/1952 | Rumble | 249—79 |
| 2,778,063 | 1/1957 | Duerksen | 18—38 |
| 2,854,692 | 10/1958 | Robbins | 18—18 |
| 2,970,346 | 2/1961 | Fannan | 18—38 |
| 3,170,193 | 2/1965 | Fike | 18—38 |

J. SPENCER OVERHOLSER, *Primary Examiner.*

J. HOWARD FLINT, JR., *Assistant Examiner.*